US012763641B2

(12) United States Patent
Neet et al.

(10) Patent No.: US 12,763,641 B2
(45) Date of Patent: Oct. 13, 2026

(54) ROTATING ELECTRICAL MACHINE BALANCE RING

(71) Applicant: BorgWarner Inc., Auburn Hills, MI (US)

(72) Inventors: Kirk Neet, Noblesville, IN (US); Matthew R. Conner, Franklin, IN (US)

(73) Assignee: BorgWarner Inc., Auburn Hills, MI (US)

( * ) Notice: Subject to any disclaimer, the term of this patent is extended or adjusted under 35 U.S.C. 154(b) by 192 days.

(21) Appl. No.: 18/739,364

(22) Filed: Jun. 11, 2024

(65) Prior Publication Data

US 2025/0379486 A1 Dec. 11, 2025

(51) Int. Cl.
*H02K 7/04* (2006.01)
*H02K 1/276* (2022.01)

(52) U.S. Cl.
CPC ............... *H02K 7/04* (2013.01); *H02K 1/276* (2013.01)

(58) Field of Classification Search
CPC ................ A61G 10/02; A61G 2203/46; A61H 2201/10; A61H 2201/107; A61H 2201/5082; A61H 33/6005; A61N 2005/064; A61N 2005/0652; A61N 2005/0668; A61N 5/0613; A61N 5/0618; A61N 5/0622; A61N 5/067; H02K 1/276; H02K 7/04
See application file for complete search history.

(56) References Cited

U.S. PATENT DOCUMENTS

| | | | | |
|---|---|---|---|---|
| 3,154,705 A * | 10/1964 | Essenburg | H02K 7/04 | 310/74 |
| 4,158,225 A * | 6/1979 | Hertz | H02K 9/06 | 310/211 |
| 6,448,675 B1 * | 9/2002 | Horng | H02K 7/04 | 310/156.04 |
| 2008/0272671 A1 * | 11/2008 | Waddell | H02K 1/24 | 29/598 |

* cited by examiner

*Primary Examiner* — Naishadh N Desai
(74) *Attorney, Agent, or Firm* — Reising Ethington P.C.

(57) ABSTRACT

A balance ring assembly for coupling to a rotor assembly of a rotating electrical machine, including a balance ring, configured to couple to a rotor assembly, formed from a ferromagnetic material, that is axially spaced from the rotor assembly by a pre-defined amount.

16 Claims, 5 Drawing Sheets

ROTATING ELECTRICAL MACHINE BALANCE RING

TECHNICAL FIELD

The present application relates to rotating electrical machines and, more particularly, to balance rings used with rotating electrical machines.

BACKGROUND

Rotating electrical machines typically include a stator assembly, having a plurality of stator windings formed within slots, concentrically receiving a rotor assembly such that the flow of electrical current through the stator windings can induce the angular movement of the rotor assembly relative to the stator assembly. Rotating electrical machines can be implemented using any one of a number of different foundational designs and, depending on the chosen design, can be manufactured using a chosen set of components and techniques. For example, the rotor assembly can include a rotor made of a stack-up of rotor laminations axially aligned and bonded or welded together. The rotor laminations can define rotor slots that securely receive permanent magnets and an inner diameter sized to receive a rotor shaft and prevent angular displacement of the rotor shaft relative to the rotor. Given that the rotor assembly may operate at elevated angular velocities and minimizing vibration at these velocities is desirable, a balancing compensation may be used.

SUMMARY

In one implementation, a balance ring assembly, for coupling to a rotor assembly of a rotating electrical machine, includes a balance ring, configured to couple to a rotor assembly, formed from a ferromagnetic material, that is axially spaced from the rotor assembly by a pre-defined amount.

In another implementation, a balance ring assembly for coupling to a rotor assembly of a rotating electrical machine includes a monolithic balance ring, having a substantially circular inner diameter and a substantially circular outer diameter, configured to couple to an end face of the rotor assembly; a plurality of protuberances formed on one surface of the monolithic balance ring in between the inner diameter and the outer diameter, configured to abut the end face of the rotor assembly and axially space the monolithic balance ring from the end face by an axial length of the protuberances.

In yet another implementation, a balance ring assembly for coupling to a rotor assembly of a rotating electrical machine includes a balance ring, having a substantially circular inner diameter and a substantially circular outer diameter; a magnetically-insulating spacer, having an inner diameter and an outer diameter, coupled to the balance ring such that a first radial face of the magnetically-insulating spacer abuts a radial face of the balance ring, and a second radial face of the magnetically-insulating spacer is configured to abut an end face of the rotor assembly.

DETAILED DESCRIPTION

A rotating electrical machine, sometimes referred to as an electric motor, typically includes a rotor assembly including a rotor, a rotor shaft received by the rotor, and one or more balance ring assemblies that help minimize unwanted vibration during operation. The rotor assembly can be received by a stator assembly having a stator with a plurality of slots arranged circumferentially around a radially inwardly-facing surface of the stator. The slots can be filled with stator windings that receive electrical current, which induces angular movement of the rotor assembly relative to the stator assembly. A balance ring assembly can be coupled to an end face of a rotor assembly to minimize vibration as the rotor assembly is angularly displaced relative to the stator assembly in response to electrical current flow through the stator wires.

The balance ring assembly can include multiple components that are coupled to an end face of the rotor assembly. In one implementation of the balance ring assembly, rather than a monolithic balance ring, the balance ring assembly can be formed from multiple components, each formed from a different material. A balance ring can be formed from a non-stainless-steel ferrous material having an inner diameter and an outer diameter that is coupled to an magnetically-insulating spacer. The balance ring assembly, having the balance ring and magnetically-insulating spacer, can then be coupled to the end face of the rotor assembly, with the magnetically-isolating spacer abutting the end face of the rotor. The magnetically-insulating spacer can provide an axial gap between the rotor and the balance ring to help minimize flux leakage from the rotor.

Another implementation of the balance ring assembly can include a monolithic balance ring having a plurality of protuberances positioned between an inner diameter and an outer diameter of the monolithic balance ring along a face of the monolithic balance ring. The monolithic balance ring can include an axially-extending rim positioned around the circumference of the monolithic balance ring. The monolithic balance ring can be formed from a ferromagnetic material, such as carbon steel, which is attracted to magnets, but others are possible. The rotor assembly can include a first balance ring assembly on one end face of the rotor assembly and a second balance ring assembly on an opposite end face of the rotor assembly. One or more axially-extending fasteners can extend through apertures in the first balance ring assembly, apertures extending axially along the axis of rotation of the rotor assembly, and apertures in the second balance ring assembly to axially compress these components. The balance rings could also be fastened to the rotor by a clip, nut (not shown), a press-fit from the balance ring ID to the shaft OD, or other similar methods.

Figure 1:
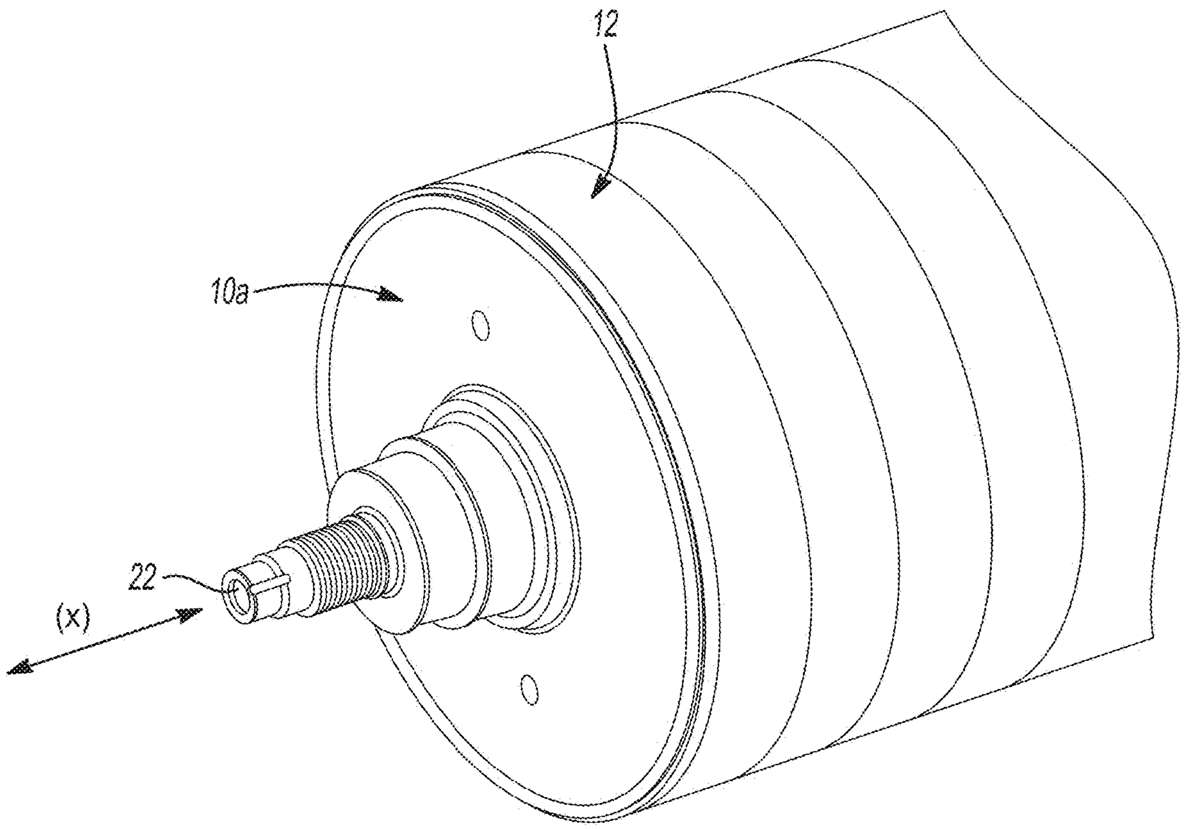
FIG. 1 is a perspective view depicting an implementation of a balance ring assembly.
Figure 2:
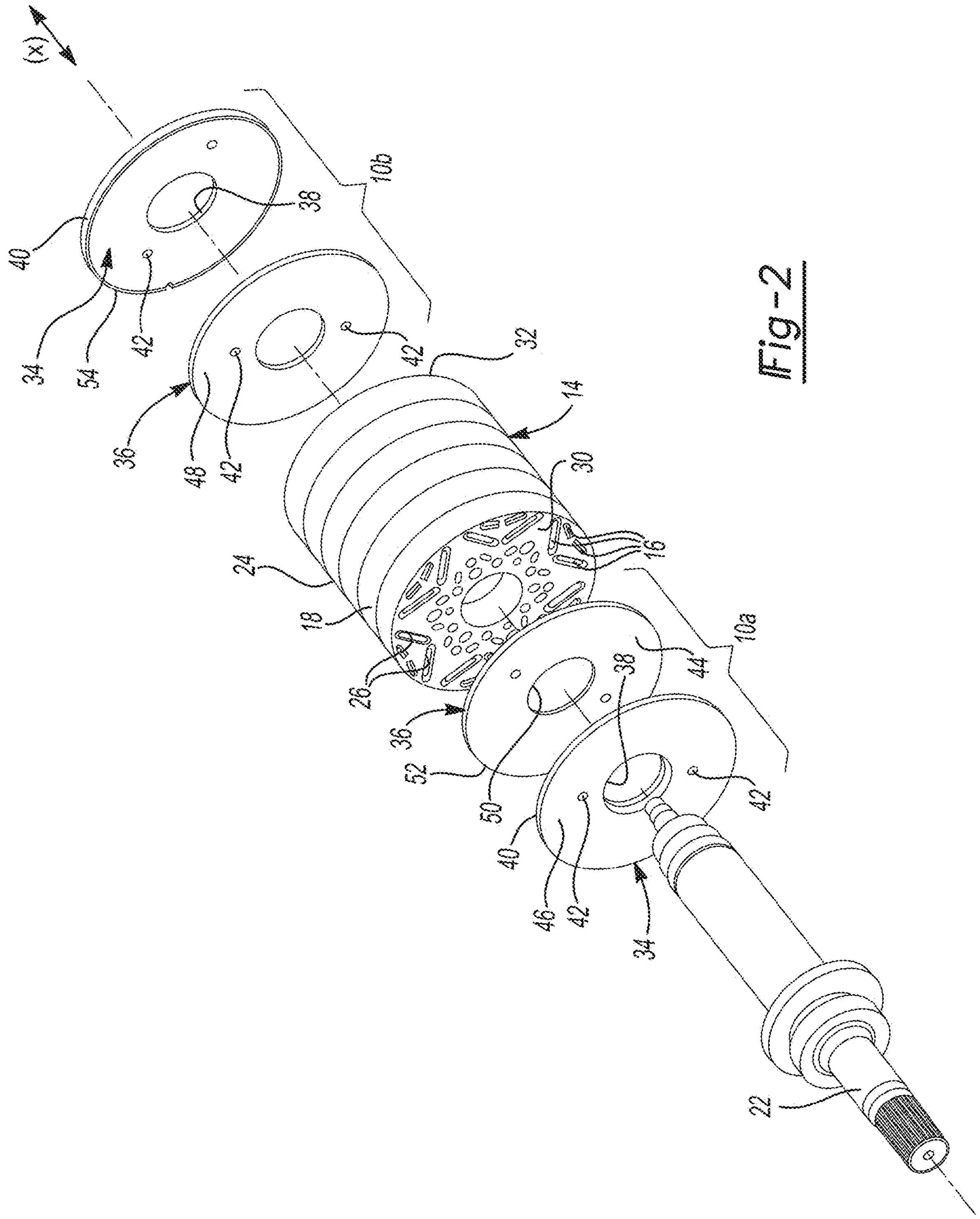
FIG. 2 is an exploded view depicting an implementation of a balance ring assembly.
Figure 3:
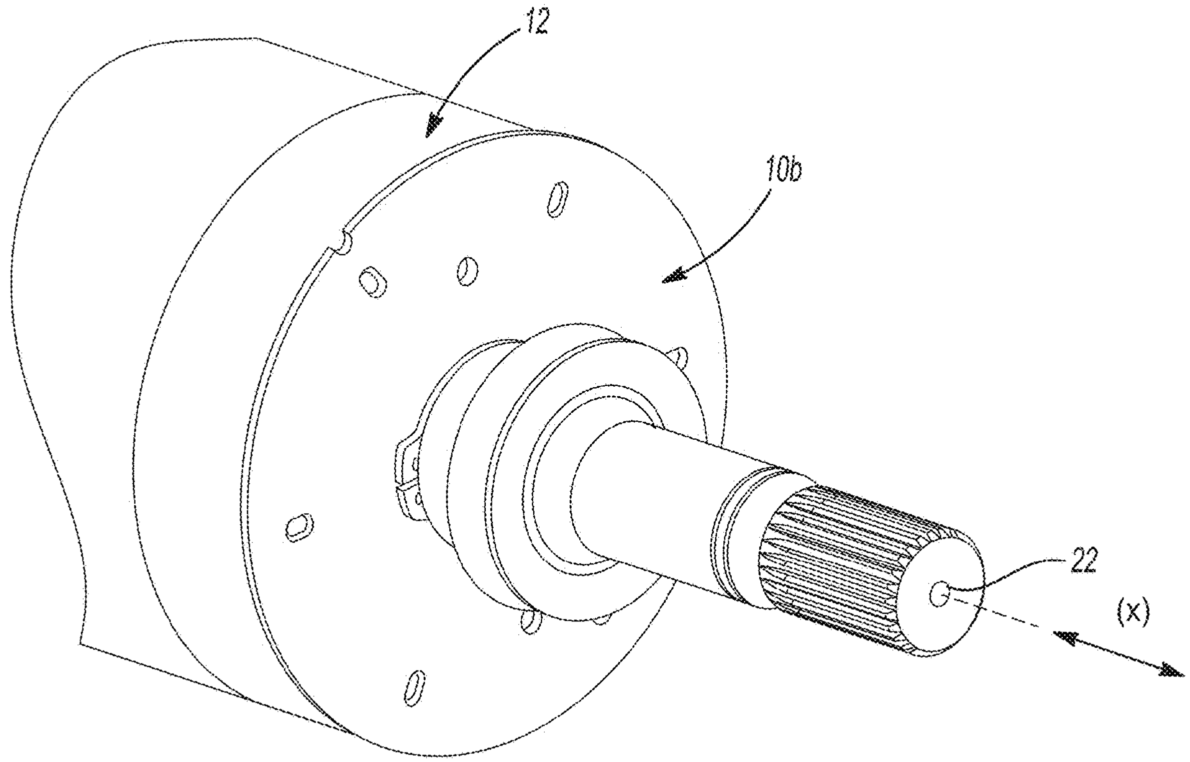
FIG. 3 is another perspective view depicting an implementation of a balance ring assembly.
Figure 4:
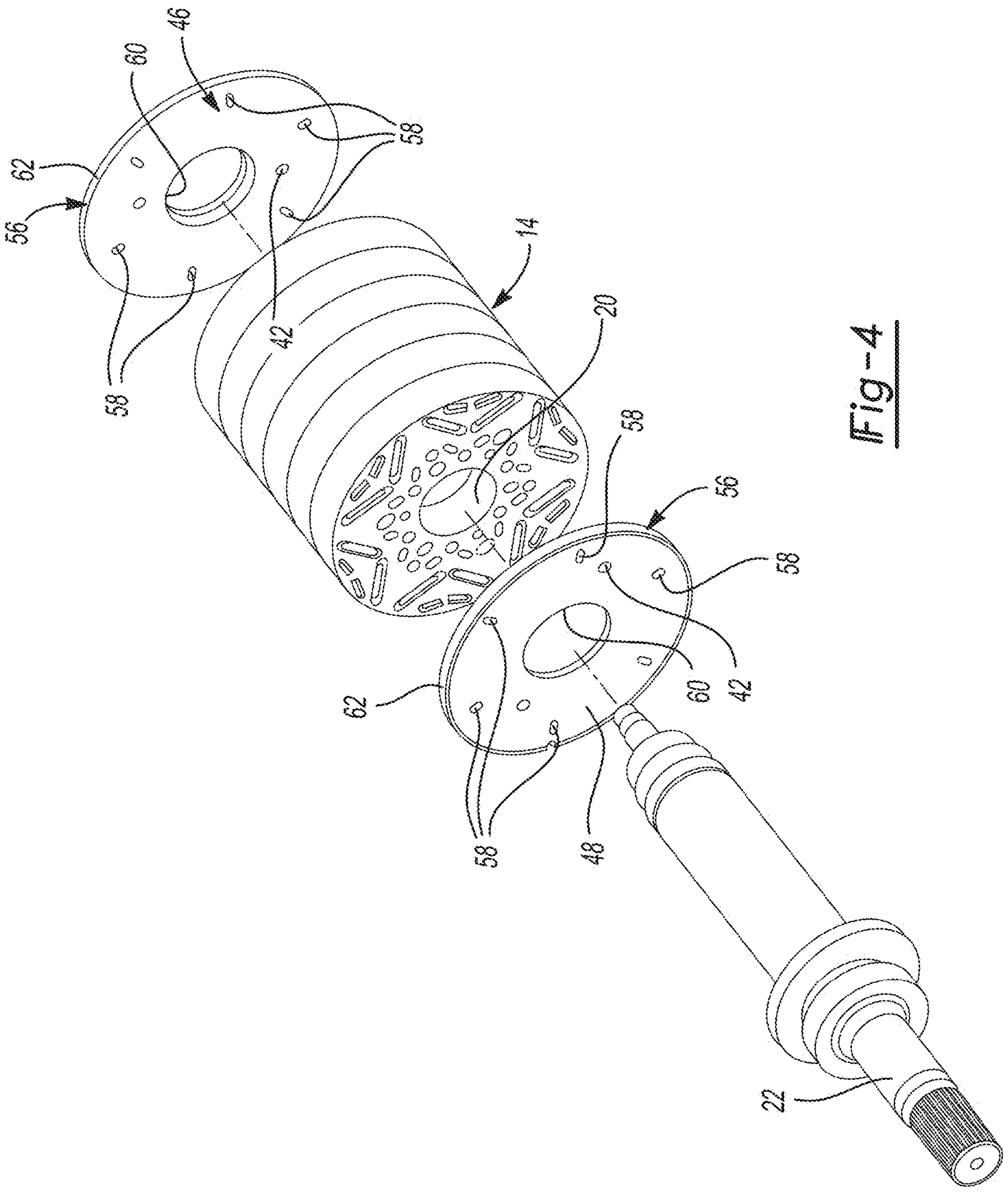
FIG. 4 is an exploded view depicting another implementation of a balance ring assembly.
Figure 5:
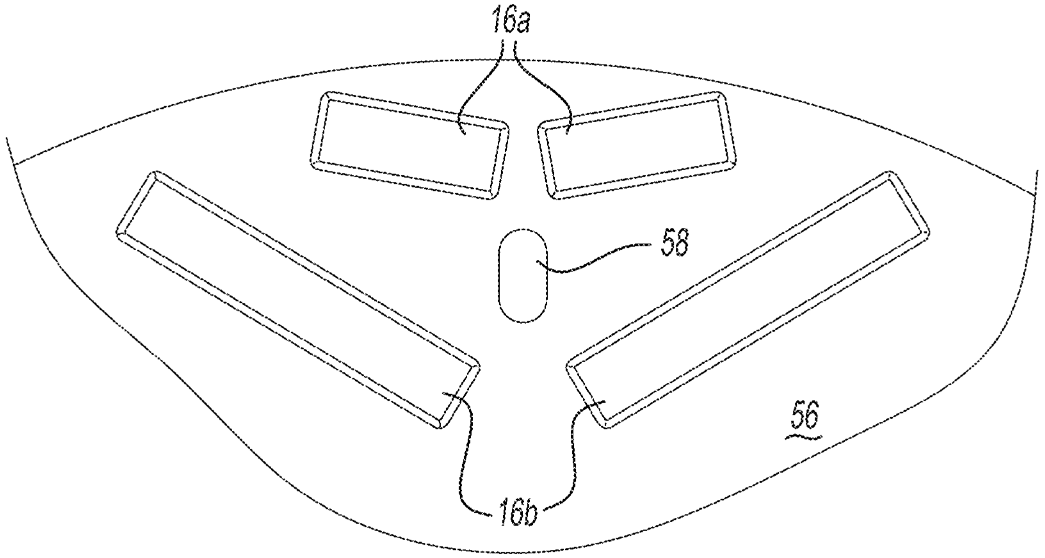
FIG. 5 is a plan view depicting a portion of an implementation of a balance ring assembly.
Figure 6:
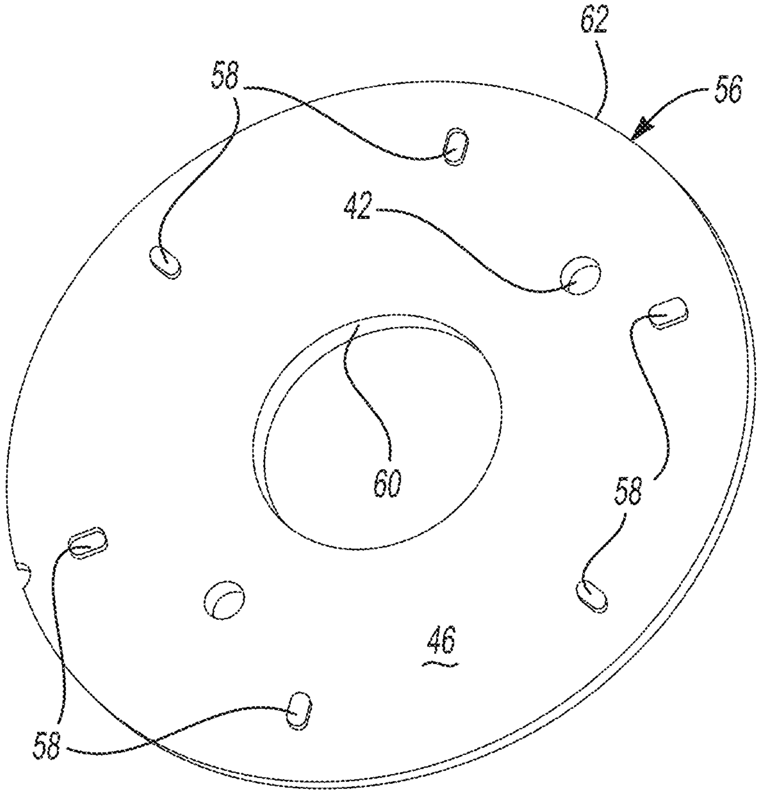
FIG. 6 is a perspective view depicting an implementation of a balance ring assembly.

Turning to FIGS. 1 and 2, an implementation of a balance ring assembly 10 is shown coupled to a rotor assembly 12. In this implementation, the rotor assembly 12 is configured to be used in a permanent magnet synchronous machine. The rotor assembly 12 includes a rotor 14 securely holding a plurality of permanent magnets 16 angularly spaced about an outer diameter of the rotor assembly 12. The rotor 14 can be formed from a plurality of lamination ministacks 18, where each ministack 18 is comprised of numerous laminations stacked together, each having an inner diameter 20 sized to closely conform to an outer diameter of a rotor shaft 22, an outer diameter 24, and magnet slots 26 for receiving permanent magnets 16. The lamination ministacks 18 can be angularly positioned relative to each other such that the magnet slots 26 and apertures 28 are aligned and extend axially along the axis of rotor rotation (x). The individual laminations of each lamination ministack 18 can be bonded together to create a rigid lamination ministack using a suitable adhesive, welds, or interlocking features.

A first balance ring assembly 10*a* can be positioned to abut a first end face 30 of the rotor assembly 12 and a second balance ring assembly 10*b* can be positioned to abut a second end face 32 of the rotor assembly 12, opposite the first balance ring assembly 10*a*. The first balance ring assembly 10*a* can include a balance ring 34 formed from a non-stainless steel ferrous material abutting an magnetically-insulating spacer 36. The balance ring 34 can have an inner diameter 38 with a size closely matching the inner diameter of the rotor assembly 12. The outer diameter 40 of the balance ring 34 can be sized to substantially match the outer diameter of the rotor assembly 12. The outer diameter 40 of the balance ring 34 could also be sized slightly smaller than the outer diameter of the rotor assembly 12. The size of the balance ring 34 having an outer diameter 40 similar to the outer diameter of the rotor assembly 12 can provide sufficient material near the outer diameter of the rotor 14 to help balance the rotor assembly 12 and also provide sufficient stiffness to axially compress the laminations 18. The non-stainless steel ferrous material can be implemented using carbon steel, for example. Carbon steel may initially exist in sheets of material that can be fed into a press machine such that balance rings 34 can be stamped from the sheet. The axial thickness of the balance ring 34 can vary depending on application. In some implementations, the axial thickness of the balance ring 34 measured in an axial direction (x) can range between 3-6 millimeters (mm).

The magnetically-insulating spacer 36 can be positioned axially in between the balance ring 34 and the end face 30, 32 of the rotor assembly 12 such that a face 44 of the magnetically-insulating spacer 36 abuts a face 46 of the balance ring 34 and an opposite face 48 of the magnetically-insulating spacer 36 abuts the end face 30, 32 of the rotor assembly 12. The magnetically-insulating spacer 36 can have an inner diameter 50 that closely conforms to an outer diameter of the rotor shaft 22 and an outer diameter 52 substantially similar to the outer diameter 40 of the balance ring 34. In some implementations, the balance ring 36 could include an axially-extending collar 54 that at least partially covers the outer diameter 40 of the balance ring 34. The magnetically-insulating spacer 36 can have an axial thickness measured along an axis of rotor rotation (x) chosen based on a desired axial space between the balance ring 34 and the end face 30, 32 of the rotor assembly 12. An axial thickness greater than 0.3 mm can help minimize flux leakage from the permanent magnets 16 received within the magnet slots 26.

It is also possible to select an axial thickness of the magnetically-insulating spacer 36 based on a size of an air gap between an outer diameter of the rotor assembly 12 and an inner diameter of the stator assembly (not shown). The axial thickness of the magnetically-insulating spacer 36 can be equal to or greater than the air gap. In one implementation, airgap equals 0.8 mm and the axial thickness of the magnetically-insulating spacer 36 can be 1.0 mm. The magnetically-insulating spacer can be formed from an elastomeric material. In one implementation, the magnetically-insulating spacer 36 can be plastic, aramid paper, Kapton™, PEEK, PFA, or similar material. The material can originally exist in sheet form such that the magnetically-insulating spacer 36 can be stamped out of the sheet with a die.

The first balance ring assembly 10*a* and the second balance ring assembly 10*b* can be constructed in similar ways, each having its own balance ring 34 and magnetically-insulating spacer 36. The first balance ring assembly 10*a* can be positioned so that the magnetically-insulating spacer 36 abuts the first end face 30 of the rotor assembly 12 and the second balance ring assembly 10*b* can be positioned on an opposite, second end face 32 of the rotor assembly 12 so that the magnetically-insulating spacer 36 abuts the second end face 32. One or more threaded fasteners (not shown) can extend through apertures 42 in the first balance ring assembly 10*a*, the rotor assembly 12, and the second balance ring assembly 10*b* to axially compress the components and form a rigid structure. The rotor shaft 22 can be press-fit into the inner diameter of the first balance ring assembly 10*a*, the rotor assembly 12, and the second balance ring assembly 10*b*.

FIGS. 3-6 depict another implementation of a balance ring assembly 100 is shown coupled to a rotor assembly 12. In this implementation, the balance ring assembly 100 includes a monolithic balance ring 56 having a plurality of protuberances 58 formed on one face 46 of the monolithic balance ring 56. The protuberances 58 extend an axial distance corresponding to a desired amount of space between the rotor assembly 12 and the balance ring assembly 100. The balance ring 56 can be formed from a non-stainless steel ferrous material. The balance ring 56 can have an inner diameter 60 with a size closely matching the inner diameter of the rotor assembly 12. The outer diameter 62 of the balance ring 56 can be sized to substantially match the outer diameter of the rotor assembly 12. The non-stainless steel ferrous material can be implemented using carbon steel, for example. Carbon steel may initially exist in sheets of material that can be fed into a press machine such that balance rings can be stamped from the sheet. In this implementation, the protuberances 58 can be formed in a die by deforming the monolithic balance ring 56 to create axially-extending protuberances 58. The die can include similarly shaped protuberances such that when the two forms of the die are compressed, depressions are formed on one radial face 48 of the monolithic balance ring 56 and the protuberances 58 are formed on an opposite radial face 46 of the monolithic balance ring 56. In some implementations, like the implementation of the balance ring assembly 10*a* discussed above with respect to FIGS. 1-2, the axial length of the protuberances 58 can be greater than 0.3 mm, larger than the airgap of the rotating electrical machine, or larger than 0.8 mm.

The protuberances 58 can be angularly positioned on the radial face 46 of the monolithic balance ring 56 to be in a defined position relative to the permanent magnets 16 of the rotor assembly 12. For example, the rotor assembly 12 can include a pole having two radially outwardly-positioned permanent magnets 16*a* angularly spaced apart from each other. The rotor assembly 12 can also include the same pole having two radially-inwardly-positioned permanent magnets 16*b* angularly spaced apart from each other. To minimize flux leakage, the monolithic balance ring 56 can be angularly positioned such that the protuberances 58 are radially spaced in between the two radially-inwardly-positioned permanent magnets 16*b* and the two radially-outwardly-positioned permanent magnets 16*a*. The protuberances 58 can also be formed on the face 46 of the monolithic balance ring 56 such that the protuberances 58 are angularly spaced between the radially-outwardly-positioned permanent magnets 16*a* and the radially-inwardly positioned permanent magnets 16*b*. The monolithic balance ring 58 can include one or more apertures 42 that are sized and positioned radially to align angularly with similarly sized/positioned apertures 42 in the rotor assembly 12. In another implementation (not shown) the balance ring 56 can be angularly positioned such that the protuberances 58 are located at least partially in contact with the magnets 16 located in the magnet slots 26 to axially retain the magnets 16 in the magnet slots 26.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms “e.g.,” “for example,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A balance ring assembly for coupling to a rotor assembly of a rotating electrical machine, comprising:

a balance ring, configured to couple to a rotor assembly, formed from a ferromagnetic material, that is axially spaced from the rotor assembly by a pre-defined amount; and a magnetically-insulating spacer coupled to a radial face of the balance ring and configured to couple to an end face of the rotor assembly;

wherein the axial length of the magnetically-insulating spacer ring is equal to or greater than a radial distance between an inner diameter of a stator assembly and an outer diameter of the rotor assembly.

2. The balance ring assembly recited in claim 1, wherein the balance ring is axially spaced from the rotor assembly by a plurality of protuberances formed on a radial face of the balance ring.

3. The balance ring assembly recited in claim 1, wherein the balance ring is not formed from stainless steel.

4. The balance ring assembly recited in claim 1, wherein the balance ring is formed from carbon steel.

5. The balance ring assembly recited in claim 1, wherein the balance ring is axially spaced from the rotor assembly by an amount that is greater than 0.3 mm.

6. The balance ring assembly recited in claim 1, wherein the balance ring comprises a substantially circular inner diameter and a substantially circular outer diameter.

7. The balance ring assembly recited in claim 1, wherein the plurality of protuberances are configured to contact the rotor assembly, the rotor assembly includes a pole having two radially-outwardly positioned permanent magnets and two radially-inwardly positioned permanent magnets and one of the plurality of protuberances contacts the rotor assembly radially at a location in between the two radially-inwardly positioned permanent magnets and the two radially-outwardly positioned permanent magnets.

8. The balance ring assembly recited in claim 1, wherein the plurality of protuberances are configured to contact the rotor assembly, the rotor assembly includes a pole having two radially-outwardly positioned permanent magnets and two radially-inwardly positioned permanent magnets and one of the plurality of protuberances contact the rotor assembly at a position angularly spaced in between the two radially-inwardly positioned permanent magnets and the two radially-outwardly positioned permanent magnets.

9. The balance ring assembly recited in claim 1, wherein the plurality of protuberances is configured to contact the rotor assembly, the rotor assembly includes a plurality of permanent magnets, and the plurality of protuberances at least partially contact the permanent magnets.

10. A balance ring assembly for coupling to a rotor assembly of a rotating electrical machine, comprising:

a monolithic balance ring, having a substantially circular inner diameter and a substantially circular outer diameter, configured to couple to an end face of the rotor assembly;

a plurality of protuberances formed on one surface of the monolithic balance ring in between the inner diameter and the outer diameter, configured to abut the end face of the rotor assembly and axially space the monolithic balance ring from the end face by an axial length of the protuberances, wherein the axial length of the plurality of protuberances is equal to or greater than a radial distance between an inner diameter of a stator assembly and an outer diameter of the rotor assembly.

11. The balance ring assembly recited in claim 10, wherein the balance ring is formed from carbon steel.

12. The balance ring assembly recited in claim 10, wherein the protuberances extend an axial length that is greater than 0.8 mm.

13. A balance ring assembly for coupling to a rotor assembly of a rotating electrical machine, comprising:

a balance ring, having a substantially circular inner diameter and a substantially circular outer diameter;

an magnetically-insulating spacer, having an inner diameter and an outer diameter, coupled to the balance ring such that a first radial face of the magnetically-insulating spacer abuts a radial face of the balance ring, and a second radial face of the magnetically-insulating spacer is configured to abut an end face of the rotor assembly, wherein the axial length of the magnetically-insulating spacer ring is equal to or greater than a radial distance between an inner diameter of a stator assembly and an outer diameter of the rotor assembly.

14. The balance ring assembly recited in claim 13, wherein the magnetically-insulating spacer extends an axial length greater than 0.3 mm.

15. The balance ring assembly recited in claim 13, wherein the balance ring is formed from carbon steel.

16. The balance ring assembly recited in claim 13, wherein the balance ring is axially spaced from the rotor assembly by an amount that is between 3-6 mm.

* * * * *